(12) United States Patent
Fujiwara (10) Patent No.: US 8,950,083 B2
(45) Date of Patent: Feb. 10, 2015

(54) DRYING DEVICE AND DRYING METHOD

(75) Inventor: Hiroki Fujiwara, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 223 days.

(21) Appl. No.: 13/394,835

(22) PCT Filed: Jan. 18, 2011

(86) PCT No.: PCT/JP2011/050739
§ 371 (c)(1),
(2), (4) Date: Mar. 8, 2012

(87) PCT Pub. No.: WO2011/102169
PCT Pub. Date: Aug. 25, 2011

(65) Prior Publication Data
US 2012/0167409 A1    Jul. 5, 2012

(30) Foreign Application Priority Data
Feb. 17, 2010  (JP) .................. 2010-032830

(51) Int. Cl.
*F26B 3/00* (2006.01)
*F26B 9/06* (2006.01)
(Continued)

(52) U.S. Cl.
CPC ............... *F26B 9/06* (2013.01); *H01M 4/0471* (2013.01); *H01M 4/139* (2013.01); *H01M 10/0409* (2013.01); *H01M 10/0587* (2013.01); *F26B 3/20* (2013.01); *F26B 5/04* (2013.01); *Y02E 60/122* (2013.01)
USPC .................. 34/427; 34/239; 257/57

(58) Field of Classification Search
CPC .......... F26B 3/00; F26B 25/06; F26B 25/18; B23K 9/00; H01J 17/04; H01R 17/04; G01N 27/62
USPC ........... 34/413, 427, 497, 201, 210, 218, 239; 257/43, 57, 347
See application file for complete search history.

(56) References Cited

U.S. PATENT DOCUMENTS 2,305,162 A  *  12/1942  Holmes .............................. 62/79
2,494,470 A  *   1/1950  Carlson ............................ 336/70
(Continued)

FOREIGN PATENT DOCUMENTS

| CN | 85 1 08178 A | 9/1986 |
|---|---|---|
| CN | 2572316 Y | 9/2003 |

(Continued)

OTHER PUBLICATIONS

Russian Decision on Grant, Nov. 13, 2013, 6 pages.
(Continued)

*Primary Examiner* — Steve M Gravini
(74) *Attorney, Agent, or Firm* — Foley & Lardner LLP (57) ABSTRACT

The present invention aims to shorten a drying time for time for drying a coiled electrode. To this end, a drying device for drying the coiled electrode wound on a winding core includes a heating unit for heating the coiled electrode from a winding core side. Since this enables heat to be transferred from a core part toward a surface of the coiled electrode, tiny spaces can be generated between layers of an electrode and moisture can be evaporated from these spaces. Thus, moisture of the core part side, which has been difficult to evaporate, can be reliably evaporated and a drying time for the coiled electrode can be shortened.

14 Claims, 9 Drawing Sheets

(51) Int. Cl.
*H01M 4/04* (2006.01)
*H01M 4/139* (2010.01)
*H01M 10/04* (2006.01)
*H01M 10/0587* (2010.01)
*F26B 3/20* (2006.01)
*F26B 5/04* (2006.01)

(56) References Cited

U.S. PATENT DOCUMENTS

| | | | |
|---|---|---|---|
| 2,561,738 A * | 7/1951 | Hill | 336/57 |
| 2,594,096 A * | 4/1952 | Trigg | 427/522 |
| 2,872,344 A * | 2/1959 | Mees | 427/295 |
| 2,949,677 A | 8/1960 | Cameron | |
| 5,775,002 A | 7/1998 | Iwase et al. | |
| 6,758,876 B2 * | 7/2004 | Suzuki et al. | 55/385.6 |
| 7,369,024 B2 * | 5/2008 | Yargole et al. | 336/61 |
| 7,834,197 B2 | 11/2010 | Nishida et al. | |
| 8,366,956 B2 | 2/2013 | Nishida et al. | |
| 2002/0155354 A1 * | 10/2002 | Wariishi et al. | 429/317 |
| 2004/0048151 A1 * | 3/2004 | Hayashi et al. | 429/162 |
| 2007/0042271 A1 | 2/2007 | Nishida et al. | |
| 2008/0057718 A1 * | 3/2008 | Omata et al. | 438/694 |
| 2011/0123873 A1 | 5/2011 | Nishida et al. | |
| 2012/0167409 A1 * | 7/2012 | Fujiwara | 34/427 |
| 2013/0004860 A1 | 1/2013 | Nishida et al. | |

FOREIGN PATENT DOCUMENTS

| | | | | |
|---|---|---|---|---|
| CN | 101593849 A | | 12/2009 | |
| EP | 1339115 A1 * | | 8/2003 | H01M 2/26 |
| EP | 2538161 A1 * | | 12/2012 | |
| JP | 2002-373701 A | | 12/2002 | |
| JP | 2004-303560 A | | 10/2004 | |
| JP | 2004-362968 A | | 12/2004 | |
| JP | 2007-122889 A | | 5/2007 | |
| JP | 2009-193841 A | | 8/2009 | |
| JP | 2009-266739 A | | 11/2009 | |
| JP | 2011169499 A * | | 9/2011 | |
| RU | 2 329 257 C2 | | 7/2008 | |
| SU | 1028975 A | | 7/1983 | |
| SU | 1737237 A1 | | 5/1992 | |

OTHER PUBLICATIONS

Chinese Office Action, Nov. 22, 2013, 6 pages.

* cited by examiner

PRIOR ART
FIG.9 ed by coiling the electrode 10
DRYING DEVICE AND DRYING METHOD

TECHNICAL FIELD

The present invention relates to a drying device and a drying method.

BACKGROUND ART

Lithium ion secondary batteries used in automotive vehicles are required to have high performances and a longer life as compared with other general-use lithium ion secondary batteries. Thus, impurities such as water need to be maximally removed.

To this end, in JP2009-266739A, electrodes of a necessary length are produced by cutting a coiled electrode and a power storage element is formed by successively laminating the produced electrodes and separators. Before the power storage element is inserted into an exterior material and an electrolyte liquid is injected, the power storage element is dried to remove moisture included in the electrodes.

SUMMARY OF INVENTION

However, in the case of drying the power storage element after the power storage element is formed, heat needs to be transferred from the outside to the inside of the power storage element. Thus, there is a problem that it takes time to transfer the amount of heat necessary for evaporation of moisture and a drying time becomes longer.

The present invention was developed in view of such a problem and an object thereof is to shorten a drying time for a coiled electrode.

To achieve the above object, the present invention is directed to a drying device for drying a coiled electrode wound on a winding core, comprising a heating unit for heating the coiled electrode from a winding core side.

An embodiment of the present invention and advantages thereof are described in detail below with reference to the accompanying drawings.

EMBODIMENT OF INVENTION

One embodiment of the present invention is described with reference to the drawings and the like.

Figure 1:
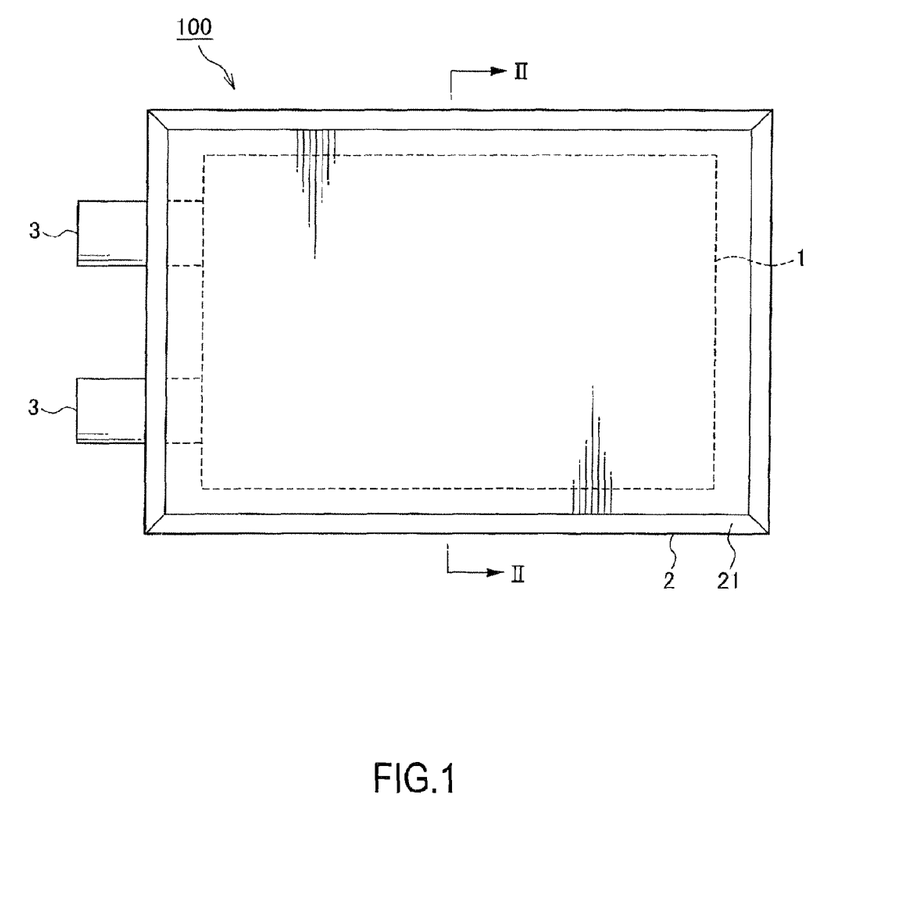
FIG. 1 is a plan view of a lithium ion secondary battery according to one embodiment of the present invention.
Figure 2:
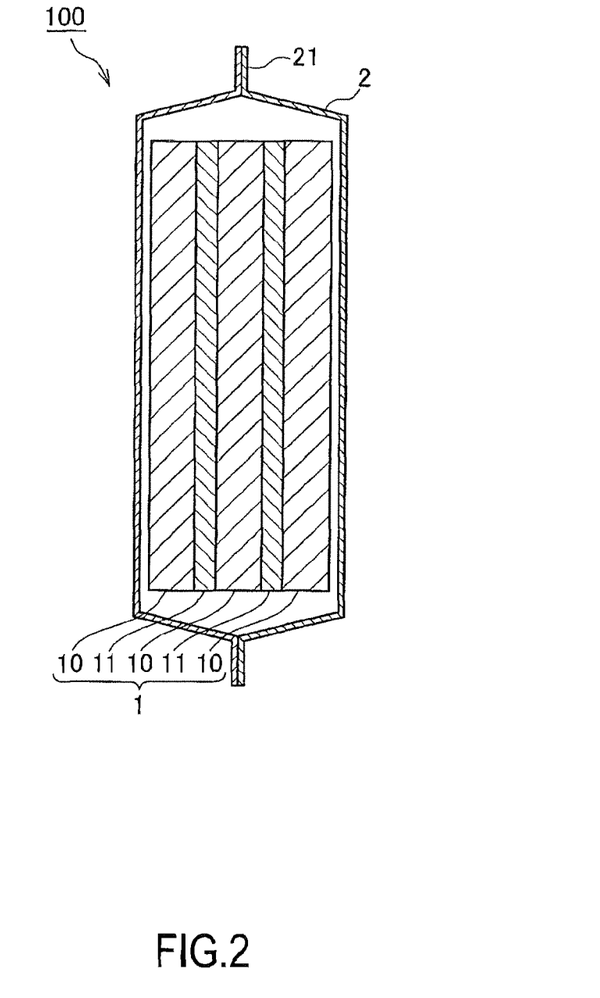
FIG. 2 is a sectional view of the lithium ion secondary battery according to the one embodiment of the present invention.

FIGS. 1 and 2 are schematic construction views of a lithium ion secondary battery. FIG. 1 is a plan view of the lithium ion secondary battery 100 and FIG. 2 is a sectional view along II-II of FIG. 1.

As shown in FIGS. 1 and 2, the lithium ion secondary battery 100 includes a power storage element 1 and an exterior material 2 for housing the power storage element 1.

The power storage element 1 is formed as a laminated body in which electrodes 10 and separators 11 as electrolyte layers are successively laminated. Terminals 3 for taking out electricity are connected to the electrodes 10 and parts of the terminals 3 project from the exterior material 2. The exterior material 2 is formed by thermally fused peripheral edge parts 21 of two laminated films placed one over the other.

Figure 3:
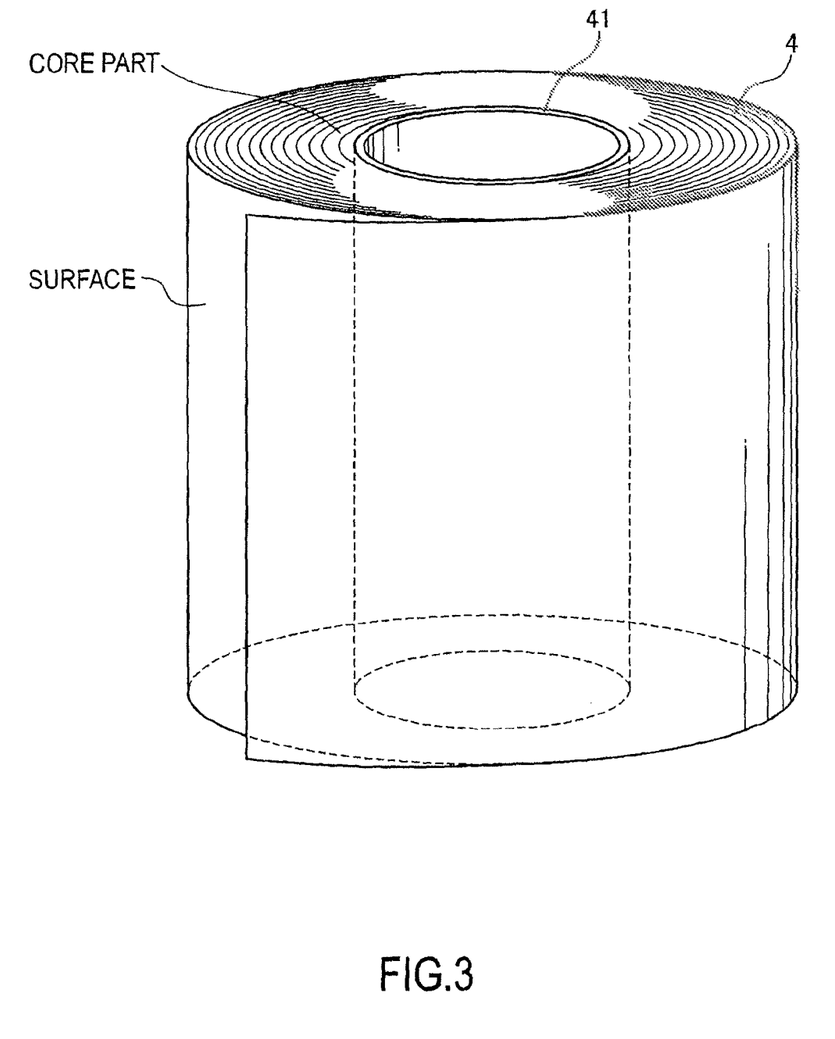
FIG. 3 is a perspective view of a coiled electrode according to the one embodiment of the present invention.

In a production process of the lithium ion secondary battery 100, the electrode 10 is produced by cutting a coiled electrode 4 shown in FIG. 3, in which the electrode 10 is coiled into a roll, after feeding the coiled electrode 4 by a necessary length. The electrode 10 is coiled into a roll in view of convenience in transportation and the like.

FIG. 3 is a perspective view of the coiled electrode 4.

The coiled electrode 4 is formed by coiling the electrode 10 into a roll about a hollow winding core 41. The electrode 10 near the winding core 41 is particularly referred to as a core part below.

Moisture in the air may condense and adhere to the electrode 10 during a period from the production of the coiled electrode 4 to a cutting process, e.g. during the transportation of the coiled electrode 4. If moisture adheres to the electrode 10, battery performances are reduced. Since the lithium ion secondary battery 100 used in an automotive vehicle has a relatively larger size than general-use lithium ion secondary batteries and more moisture adheres thereto, a measure against moisture adhesion is particularly necessary.

Since the power storage element 1 is formed as a laminated body in which a plurality of electrodes 10 and a plurality of separators 11 are successively laminated, the amount of heat necessary to remove moisture cannot be applied to the inner electrodes 10 and the moisture is insufficiently removed if the power storage element 1 is dried, for example, after the power storage element 1 is formed. Accordingly, it is preferable to dry the coiled electrode 4 before the cutting process.

Figure 7:
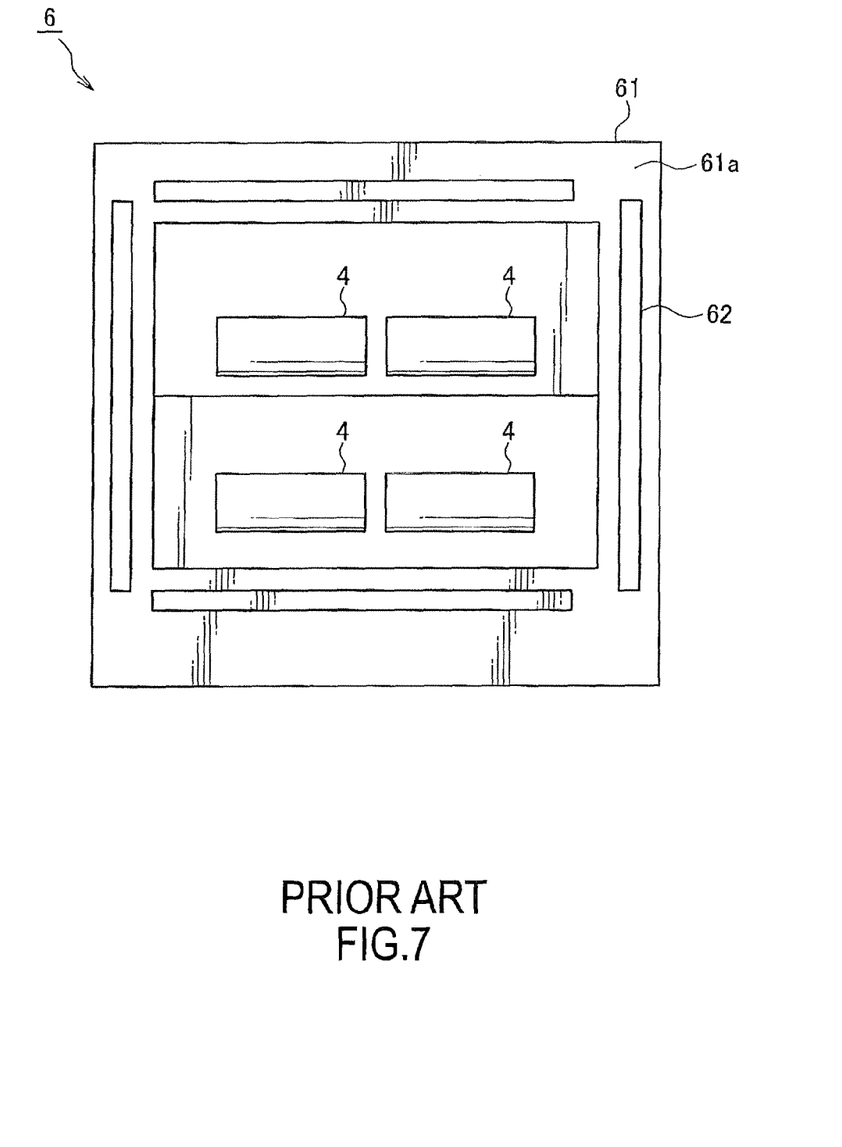
FIG. 7 is a schematic construction diagram of a conventional general-purpose radiation vacuum dryer.

However, if the coiled electrode 4 is heated and dried from the surface of the coiled electrode 4 using a general-purpose radiation vacuum dryer 6 shown in FIG. 7, there has been a problem that the drying is likely to be insufficient and it takes a long time until the drying is completed. This problem is described below with reference to FIGS. 7 to 9.

FIG. 7 is a schematic construction diagram of the general-purpose radiation vacuum dryer 6.

As shown in FIG. 7, the general-purpose radiation vacuum dryer 6 has been drying coiled electrodes 4 by heating the surfaces of coiled electrodes 4 by a heater 62 arranged on an outer wall 61a of a vacuum chamber 61, transferring heat from the surfaces toward core parts and evaporating moisture adhering to the coiled electrodes 4.

Figure 8:
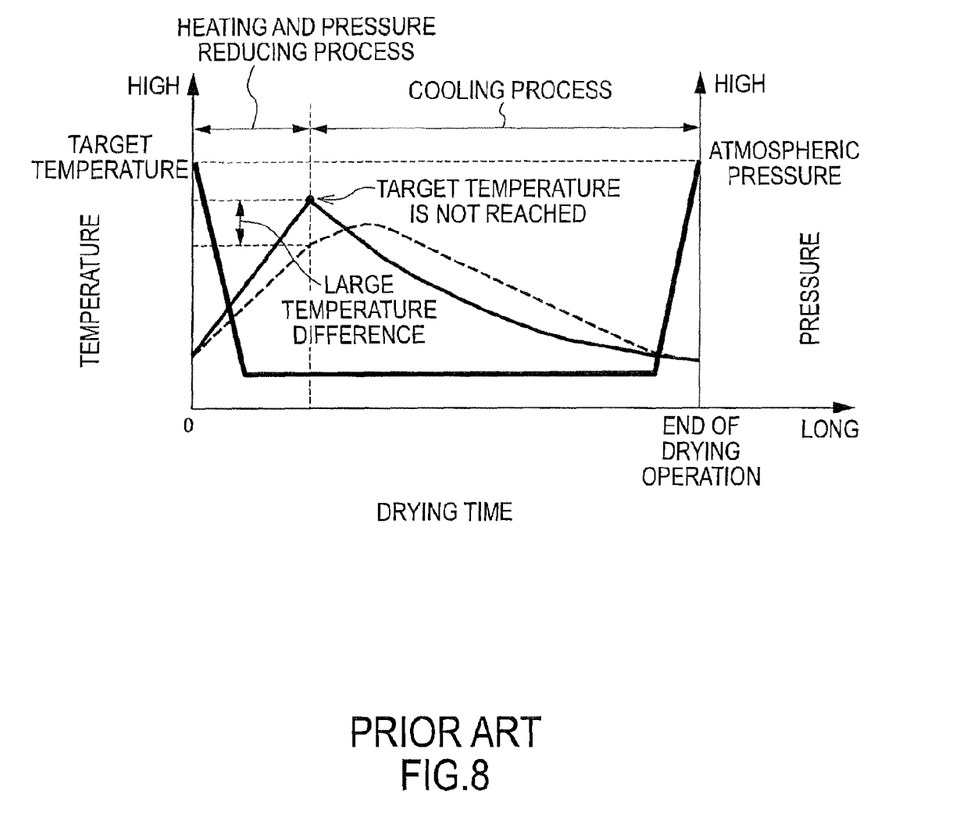
FIG. 8 is a time chart showing an example of the temperature of the coiled electrode and a change in pressure in the vacuum chamber with time when the conventional general-purpose radiation vacuum dryer was used.

FIG. 8 is a time chart showing the temperature of the coiled electrode 4 and a change in pressure in the vacuum chamber with time when the general-purpose radiation vacuum dryer 6 is used. This explains an example of a drying method for the coiled electrode 4 by the general-purpose radiation vacuum dryer 6. In FIG. 8, thick line represents the pressure in the vacuum chamber, thin line represents the surface temperature of the coiled electrode 4 and thin broken line represents the temperature of the core part of the coiled electrode 4.

As shown in FIG. 8, in the case of this drying method, the coiled electrode 4 is dried by reducing the pressure in the vacuum chamber simultaneously with the heating to reduce a boiling point (heating and pressure reducing process). However, if a degree of vacuum is increased by reducing the pressure in the vacuum chamber below the atmospheric pressure during the heating, a heat-transfer coefficient of the atmosphere in the vacuum chamber is reduced. Thus, the heating is mainly performed only by radiation heat, wherefore the amount of heat reaching the surface of the coiled electrode 4 becomes insufficient and the surface of the coiled electrode 4 cannot be heated to a target temperature necessary to sufficiently dry the coiled electrode 4. It takes a long time if it is tried to heat the surface of the coiled electrode 4 to the target temperature.

Further, since the heating of the surface is insufficient, it takes time for the heat to transfer from the surface to the core part and a temperature difference between the surface and the core part is likely to be large. Thus, it is difficult to evenly dry the entire coiled electrode and the drying of the core part is likely to be insufficient.

Further, since the electrode itself is made of a material that needs to be carefully handled, the amount of heat necessary to remove moisture cannot be given in many cases.

Furthermore, a cooling period needs to be provided after the drying is completed, but the cooling also takes time since the heat-transfer coefficient in the vacuum chamber is low as described above (cooling process).

Figure 9:
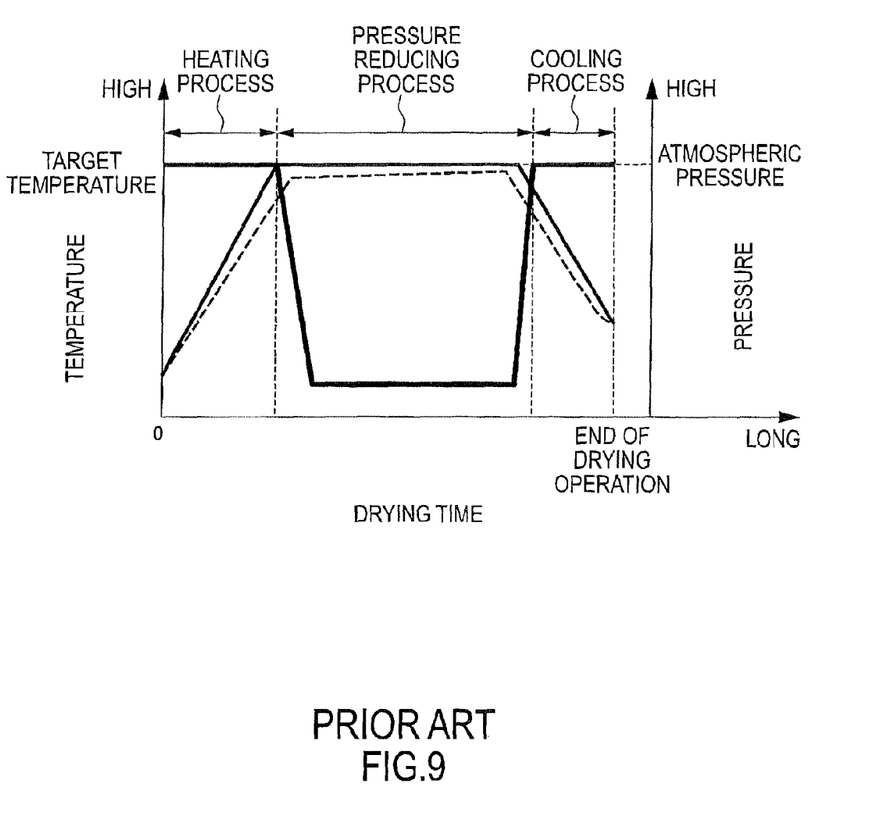
FIG. 9 is a time chart showing another example of the temperature of the coiled electrode and a change in pressure in the vacuum chamber with time when the conventional general-purpose radiation vacuum dryer was used.

FIG. 9 is a time chart showing the temperature of the coiled electrode 4 and a change in pressure in the vacuum chamber with time when the general-purpose radiation vacuum dryer 6 is used to explain another example of the drying method for the coiled electrode 4 by the general-purpose radiation vacuum dryer 6. In FIG. 9, thick line represents the pressure in the vacuum chamber, thin line represents the surface temperature of the coiled electrode 4 and thin broken line represents the temperature of the core part of the coiled electrode 4.

As shown in FIG. 9, in the case of this drying method, the heating is performed until the surface of the coiled electrode 4 reaches a target temperature under an atmospheric pressure (heating process). When the surface of the coiled electrode 4 reaches the target temperature, the coiled electrode 4 is dried by reducing the pressure in the vacuum chamber to reduce a boiling point (pressure reducing process). In this case, the coiled electrode 4 is not dried in the heating process since the boiling point is not reduced, and the drying is performed in the pressure reducing process. After the drying is completed, the pressure in the vacuum chamber is returned to the atmospheric pressure to cool the coiled electrode 4 (cooling process).

By heating under the atmospheric pressure and then reducing the pressure in this way, the surface of the coiled electrode 4 can reliably reach the target temperature in a short time and the drying can be sufficiently performed by the heating to the target temperature.

However, it takes time to finish from the heating to the drying since the heating process and the pressure reducing process are separately performed. Further, it is not possible to shorten a time necessary for the pressure reducing process, i.e. a time necessary to dry the coiled electrode 4. Further, since layers of the electrode 10 are held in close contact in the coiled electrode 4, moisture in the coiled electrode can be evaporated only from the surface. Thus, the time necessary for the pressure reducing process is likely to be particularly long.

If the drying operation of the coiled electrode 4 takes time as just described, the number of general-purpose radiation vacuum dryers 6 needs to be increased to ensure a necessary production volume, wherefore production cost of the lithium ion secondary battery 100 increases.

Accordingly, in this embodiment, the time required for the drying operation is shortened by changing a drying device and a drying method.

Figure 4:
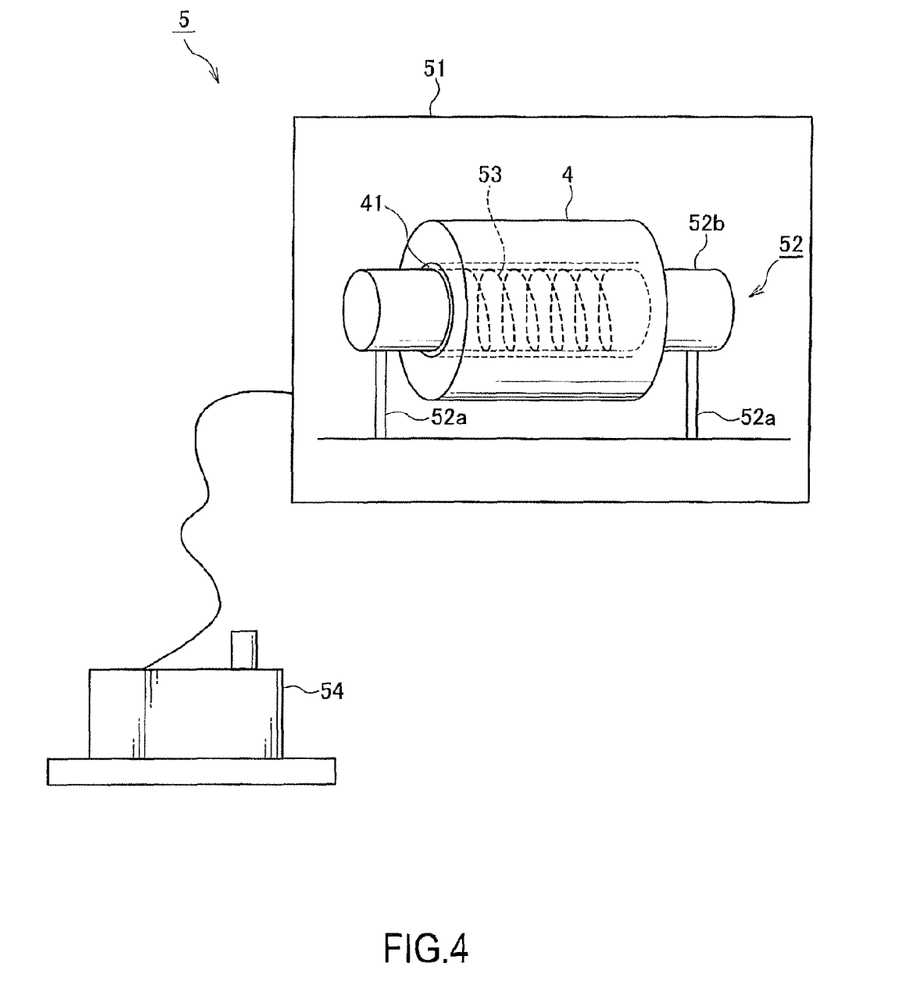
FIG. 4 is a schematic construction diagram of a drying device according to the one embodiment of the present invention.

FIG. 4 is a schematic construction diagram of a drying device 5 according to this embodiment.

The drying device 5 includes a vacuum chamber 51, a supporting member 52, a heater 53 and a vacuum pump 54.

The vacuum chamber 51 is a container which is so constructed that the coiled electrode 4 can be transferred thereinto and therefrom and has high sealability so that gas does not flow thereinto after pressure reduction.

The supporting member 52 includes a supporting bar 52a fixed to the vacuum chamber 51 and a tube part 52b removably fixed to the supporting bar 52a, and is arranged in the vacuum chamber 51. The supporting member 52 supports the coiled electrode 4 by inserting the tube part 52b into the winding core 41 of the coiled electrode 4.

The heater 53 is provided on or near the outer peripheral surface of the tube part 52b and transfers heat from the core part toward the surface of the coiled electrode 4.

The vacuum pump 54 is provided outside the vacuum chamber 51 and discharges gas in the vacuum chamber 51 to the outside.

Since the tube part of the supporting member 52 and the winding core 41 of the coiled electrode 4 are in contact in the drying device 5 according to this embodiment as just described, heat of the heater 53 can be transferred to the core part of the coiled electrode 4 by heat conduction.

Figure 5A:
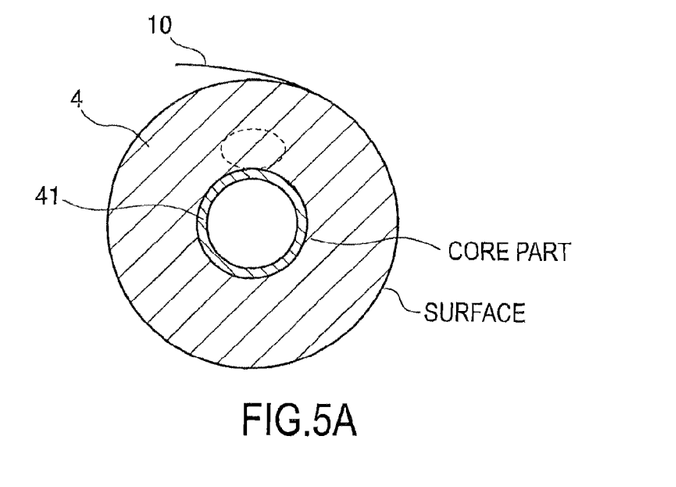
FIG. 5A is a sectional view of the coiled electrode according to the one embodiment of the present invention.
Figure 5B:
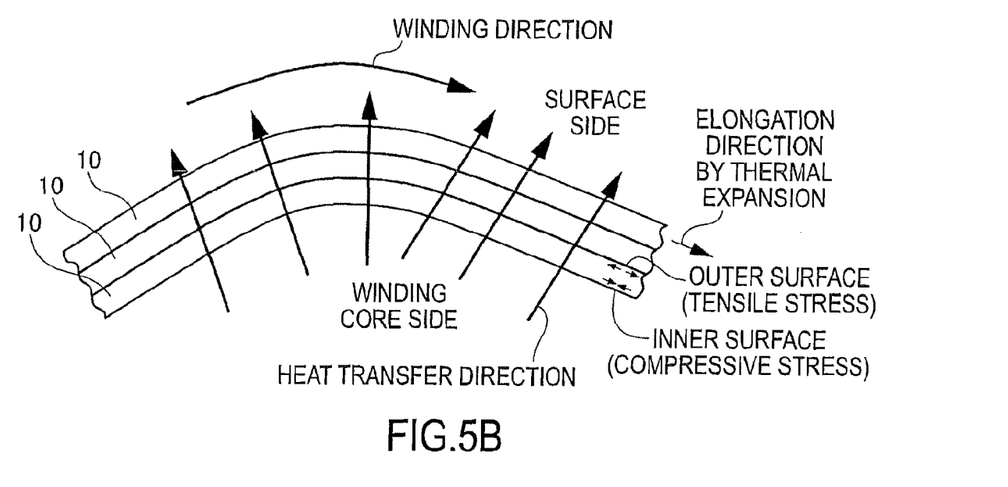
FIG. 5B is an enlarged view of a part of FIG. 5A enclosed by broken line.
Figure 5C:
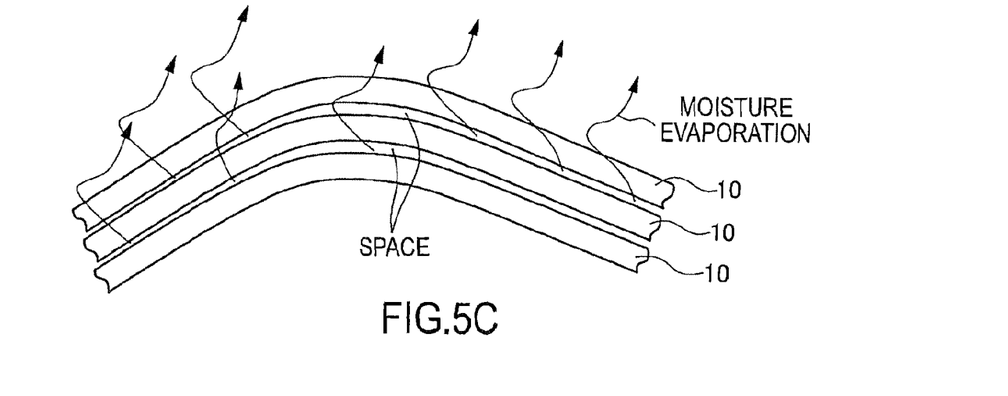
FIG. 5C is an enlarged view of the part of FIG. 5A enclosed by broken line.

FIGS. 5A to 5C are views showing a function of the drying device 5 according to this embodiment. FIG. 5A is a sectional view of the coiled electrode 4. FIG. 5B is an enlarged view of a part of FIG. 5A enclosed by broken line. FIG. 5C is an enlarged view of the part of FIG. 5A enclosed by broken line after being heated by the drying device 5.

As shown in FIG. 5B, the drying device 5 dries the coiled electrode 4 by directly heating the core part of the coiled electrode 4 and transferring heat from the core part toward the surface by heat conduction. Thus, a comparison of temperature between a winding core side and a surface side of the coiled electrode 4 shows that temperature is higher on the winding core side than on the surface side. Also a comparison of temperature between the electrode 10 closer to the winding core (hereinafter, referred to as an "inner surface") and a surface thereof closer to the surface (hereinafter, referred to as an "outer surface") shows that, temperature is naturally higher on the inner surface than on the outer surface.

If temperature is higher on the inner surface than on the outer surface when there is a temperature difference between the inner and outer surfaces of the electrode 10 coiled into a roll, compressive stress is generated in a winding direction on the inner surface and tensile stress is generated in the winding direction on the outer surface. Further, the electrode 10 is elongated in the winding direction by thermal expansion.

Thus, as shown in FIG. 5C, the electrode 10 is deformed in a wavy manner and crimped by the action of these stresses and thermal expansion, thereby forming tiny spaces between layers of the wound electrode 10. By intentionally forming the tiny spaces between the layers of the electrode 10 in this way, moisture can be evaporated from these spaces. Accordingly, moisture can be directly evaporated not only from the surface of the coiled electrode 4, but also from the inside of the coiled electrode 4, wherefore the time required to dry the coiled electrode 4 itself can be shortened.

Figure 6:
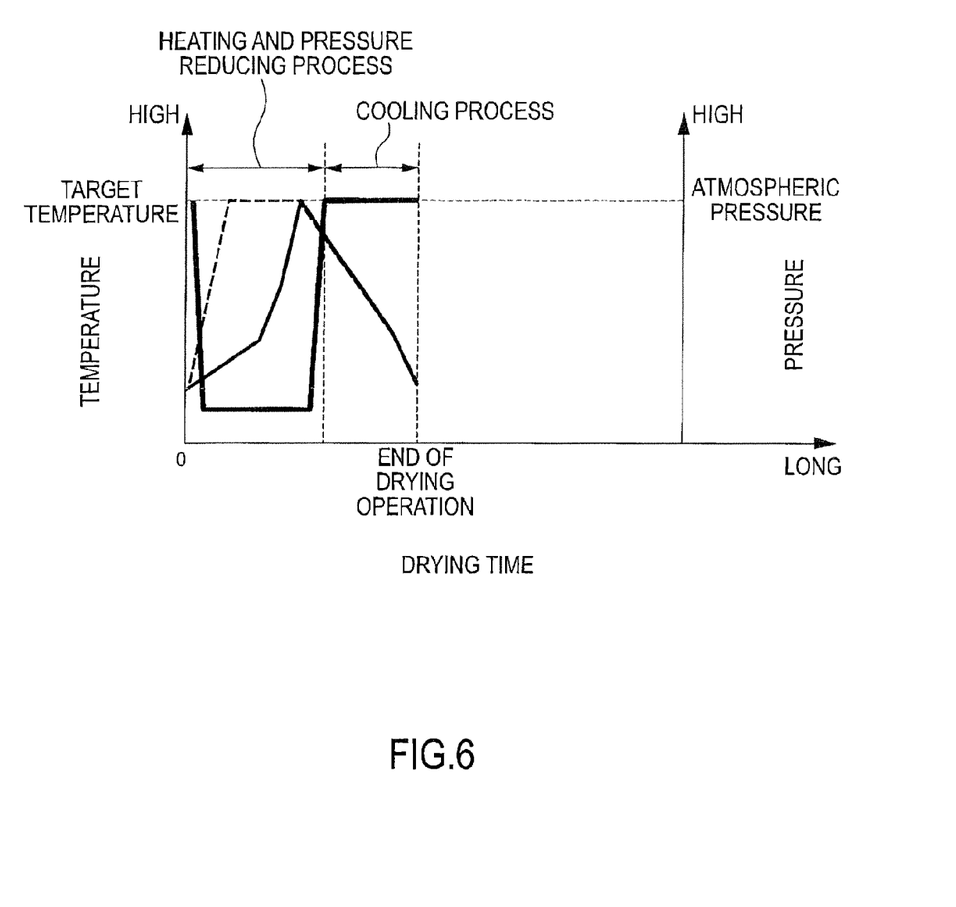
FIG. 6 is a time chart showing the temperature of the coiled electrode and a change in pressure in a vacuum chamber with time when the drying device according to the one embodiment of the present invention was used.

FIG. 6 is a time chart showing the temperature of the coiled electrode 4 and a change in pressure in the vacuum chamber with time when the drying device 5 was used. This explains the drying method for the coiled electrode 4 by the drying device 5. In FIG. 6, thick line represents the pressure in the vacuum chamber, thin line represents the surface temperature of the coiled electrode 4 and thin broken line represents the temperature of the core part of the coiled electrode 4.

As shown in FIG. 6, in the case of the drying method using the drying device 5, the coiled electrode 4 is dried by starting to reduce the pressure in the vacuum chamber simultaneously with the start of heating to reduce a boiling point (heating and pressure reducing process). After the drying is completed, the coiled electrode 4 is cooled by returning the pressure in the vacuum chamber to the atmospheric pressure (cooling process).

Since the tube part 52b of the supporting member 52 and the winding core 41 of the coiled electrode 4 are in contact in the case of the drying device 5, even if the pressure in the vacuum chamber is reduced simultaneously with the heating, heat of the heater 53 can be directly transferred to the core part of the coiled electrode 4 by heat conduction without being affected by the atmosphere in the vacuum chamber.

Thus, the temperature of the core part of the coiled electrode 4 can be quickly increased to the target temperature and the drying can be performed while the heating is performed.

By transferring the heat from the core part toward the surface, the electrode 10 can be crimped to form tiny spaces between the layers of the electrode 10 as described above. Thus, moisture can be evaporated from these spaces, wherefore the time required for the drying can be shortened and moisture of the core part side, which has been difficult to evaporate by the general-use radiation vacuum dryer 6, can be reliably evaporated.

Further, since the pressure in the vacuum chamber is returned to the atmospheric pressure after the drying is finished, the heat-transfer coefficient of the atmosphere in the vacuum chamber also returns and heat can be radiated from the surface of the coiled electrode 4 by convection. Thus, the cooling period can be shortened as compared with the case of cooling with the pressure in the vacuum chamber reduced.

As just described, since the heating and the drying can be simultaneously performed according to the drying device 5 of this embodiment, a period required for the entire drying operation can be shortened as compared with the case of separately performing the heating process and the drying process.

Further, by transferring heat from the core part toward the surface of the coiled electrode 4, tiny spaces are formed between the layers of the electrode 10 and moisture can be evaporated from these spaces. Thus, the time required for the drying itself can be shortened. Therefore, the period required for the entire drying operation can be shortened.

Further, by forming the tiny spaces between the layers of the electrode 10 and evaporating moisture from these spaces, it is possible to reliably evaporate moisture of the core part side, which has been difficult to evaporate by the general-purpose radiation vacuum dryer 6, and moisture adhering to tiny parts.

Further, since the cooling is performed under the atmospheric pressure, the cooling time can be shortened as compared with the case of cooling with the pressure in the vacuum chamber reduced.

Concerning the above description, the contents of Japanese Patent Application No. 2010-32830 filed with the Japan Patent Office on Feb. 17, 2010 are hereby incorporated by reference.

This invention has been described above by way of the specific embodiment, but this invention is not limited to the above embodiment. It is possible for a person skilled in the art to make various modifications and changes in the above embodiment within the technical scope of the present invention.

For example, although the drying device 5 is used to dry the coiled electrode 4 in the above embodiment, it may be used for things other than electrodes and electrodes are not limited to rolled ones.

Further, although the drying and the pressure reducing are simultaneously performed in the embodiment above, the pressure in the vacuum chamber may be reduced to a target pressure and then the heating may be performed while the pressure reduced state is maintained. Since the drying device 5 directly heats the core part by heat conduction by the heater 53, quick heating to the target temperature is possible without depending on the atmosphere in the vacuum chamber even after the pressure reduction.

Further, although the tube part 52b is inserted into the winding core 41 of the coiled electrode 4 and the coiled electrode 4 is heated from the core part toward the surface by the heater 53 provided on the tube part 52b, a heating unit such as a heater may be provided on a tubular or columnar winding core itself and fixed to the supporting bar 52a and the coiled electrode 4 may be heated from the core part toward the surface.

The invention claimed is:

1. A drying device for drying a coiled electrode wound on a winding core, comprising:
   a supporting part configured to be inserted into the winding core, which is hollow, to support the coiled electrode, which is comprised of an electrode that is wound so as to have a plurality of radially overlapping portions; and
   a heating unit configured to heat the coiled electrode from the winding core.

2. The drying device according to claim 1, wherein the heating unit is provided on the supporting part.

3. The drying device according to claim 1, wherein the heating unit is provided on the winding core.

4. The drying device according to claim 1, further comprising:
   a container configured to house the coiled electrode; and
   a pressure reducer configured to accelerate the drying of the coiled electrode by reducing a pressure in the container to reduce a boiling point in the container;
   wherein heating by the heating unit and pressure reduction by the pressure reducer are simultaneously performed.

5. The drying device according to claim 1, further comprising:
   a container configured to house the coiled electrode; and
   a pressure reducer configured to accelerate the drying of the coiled electrode by reducing a pressure in the container to reduce a boiling point in the container;
   wherein heating by the heating unit is performed after pressure reduction by the pressure reducer.

6. A drying method for drying a coiled electrode wound on a winding core, comprising:

supporting the coiled electrode, which is comprised of an electrode that is wound so as to have a plurality of radially overlapping portions, by inserting a supporting part into the winding core, which is hollow; and a heating process of heating the coiled electrode from the winding core.

7. The drying method according to claim 6, wherein the heating process comprises heating the coiled electrode from the winding core by a heating unit provided on the supporting part.

8. The drying method according to claim 6, wherein the heating process comprises heating the coiled electrode from the winding core by a heating unit provided on the winding core.

9. The drying method according to claim 6, further comprising a pressure reducing process of reducing a pressure in a container configured to house the coiled electrode, wherein the heating process and the pressure reducing process are simultaneously performed.

10. The drying method according to claim 6, further comprising a pressure reducing process of reducing a pressure in a container configured to house the coiled electrode, wherein the heating process is performed after the pressure reducing process.

11. The drying device according to claim 1, wherein the heating unit is configured to heat the coiled electrode from the winding core by conduction.

12. The drying device according to claim 1, wherein the heating unit is configured to cause a temperature difference between a winding core side and a surface side of the coiled electrode, and wherein the temperature difference generates a compressive stress in a winding direction on the winding core side and a tensile stress in the winding direction that deforms and crimps the electrode such that spaces are formed between adjacent, radially overlapping portions of the electrode.

13. The drying method according to claim 6, wherein the heating process comprises heating the coiled electrode from the winding core by conduction.

14. The drying method according to claim 6, wherein the heating process causes a temperature difference between a winding core side and a surface side of the coiled electrode, and wherein the temperature difference generates a compressive stress in a winding direction on the winding core side and a tensile stress in the winding direction that deforms and crimps the electrode such that spaces are formed between adjacent, radially overlapping portions of the electrode.

\* \* \* \* \*